US 8,917,609 B2

(12) United States Patent
Yoshida

(10) Patent No.: US 8,917,609 B2
(45) Date of Patent: Dec. 23, 2014

(54) LINE MONITORING APPARATUS AND LINE MONITORING METHOD

(75) Inventor: Norihiro Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1301 days.

(21) Appl. No.: 12/405,709

(22) Filed: Mar. 17, 2009

(65) Prior Publication Data

US 2009/0238083 A1     Sep. 24, 2009

(30) Foreign Application Priority Data

Mar. 18, 2008     (JP) .................................. 2008-69491

(51) Int. Cl.
*H04J 1/16*     (2006.01)
*H04L 12/26*    (2006.01)
*H04L 12/24*    (2006.01)

(52) U.S. Cl.
CPC ............. *H04L 43/16* (2013.01); *H04L 41/0213* (2013.01)
USPC ............................ 370/242; 370/248; 370/251

(58) Field of Classification Search
USPC ........................................................ 370/400
See application file for complete search history.

(56) References Cited

U.S. PATENT DOCUMENTS

| | | | | |
|---|---|---|---|---|
| 4,736,444 A * | 4/1988 | Dhein | ............................. | 379/33 |
| 5,101,199 A * | 3/1992 | Suzuki | .......................... | 370/449 |
| 5,386,584 A * | 1/1995 | Verstegen et al. | ................ | 710/59 |
| 5,414,858 A * | 5/1995 | Hoffman et al. | ................. | 710/48 |
| 5,471,618 A * | 11/1995 | Isfeld | ............................. | 710/19 |
| 5,483,647 A * | 1/1996 | Yu et al. | ........................ | 713/100 |
| 5,535,380 A * | 7/1996 | Bergkvist et al. | ............. | 713/502 |
| 5,555,414 A * | 9/1996 | Hough et al. | .................. | 710/261 |
| 5,652,905 A * | 7/1997 | Shinjo et al. | ................... | 709/234 |
| 5,948,093 A * | 9/1999 | Swanstrom et al. | .......... | 710/267 |
| 6,065,073 A * | 5/2000 | Booth | ............................. | 710/46 |
| 6,173,343 B1 * | 1/2001 | Delorme | ........................ | 710/48 |
| 6,349,123 B1 * | 2/2002 | Kim | ................................ | 370/480 |
| 6,434,651 B1 * | 8/2002 | Gentry, Jr. | ..................... | 710/260 |
| 6,453,014 B1 * | 9/2002 | Jacobson et al. | ........... | 379/26.01 |
| 6,467,008 B1 * | 10/2002 | Gentry et al. | ................. | 710/261 |

(Continued)

FOREIGN PATENT DOCUMENTS

| | | |
|---|---|---|
| JP | 63-280537 | 11/1988 |
| JP | 4-319842  | 10/1992 |
| JP | 5-300195  | 11/1993 |
| JP | 7-146797  | 6/1995  |

OTHER PUBLICATIONS

Japanese Office Action for Application No. 2008-069491 issued Jun. 26, 2012.

(Continued)

*Primary Examiner* — Ricky Ngo
*Assistant Examiner* — Dewanda Samuel
(74) *Attorney, Agent, or Firm* — Staas & Halsey LLP

(57) ABSTRACT

A line monitoring apparatus includes a state change detection number counter configured to count a state change detection number that is a number of a state change in a line being detected by a first type detecting process; and a state change frequency determiner configured to determine whether or not the state change detection number counted per a predetermined unit time exceeds a predetermined threshold value, wherein when the state change detection number counted per the unit time exceeds the threshold value, the detecting process of detecting a state change in the line is changed from the first type detecting process to a second type detecting process.

22 Claims, 11 Drawing Sheets

(56) References Cited

U.S. PATENT DOCUMENTS

| | | | |
|---|---|---|---|
| 6,633,577 B1* | 10/2003 | Nyu | 370/416 |
| 6,738,849 B2* | 5/2004 | Morgan et al. | 710/264 |
| 6,754,309 B2* | 6/2004 | Nakagawa et al. | 379/27.01 |
| 6,882,653 B1* | 4/2005 | Kiuchi et al. | 370/401 |
| 7,517,243 B2* | 4/2009 | Caveney et al. | 439/489 |
| 7,676,610 B2* | 3/2010 | Nakashima et al. | 710/48 |
| 7,777,777 B2* | 8/2010 | Bowman et al. | 348/14.08 |
| 8,256,397 B2* | 9/2012 | Cowgill | 123/321 |
| 2002/0163890 A1* | 11/2002 | Yoshimoto et al. | 370/241 |
| 2003/0163627 A1* | 8/2003 | Deng et al. | 710/305 |
| 2004/0024865 A1* | 2/2004 | Huang et al. | 709/224 |
| 2004/0153701 A1* | 8/2004 | Pickell | 714/4 |
| 2006/0229896 A1* | 10/2006 | Rosen et al. | 705/1 |
| 2010/0284414 A1* | 11/2010 | Agarwal et al. | 370/401 |

OTHER PUBLICATIONS

Japanese Office Action issued Apr. 9, 2013 for corresponding Japanese Application No. 2008-069491.

Japanese Office Action for application No. 2008-069491 issued Oct. 16, 2012.

* cited by examiner

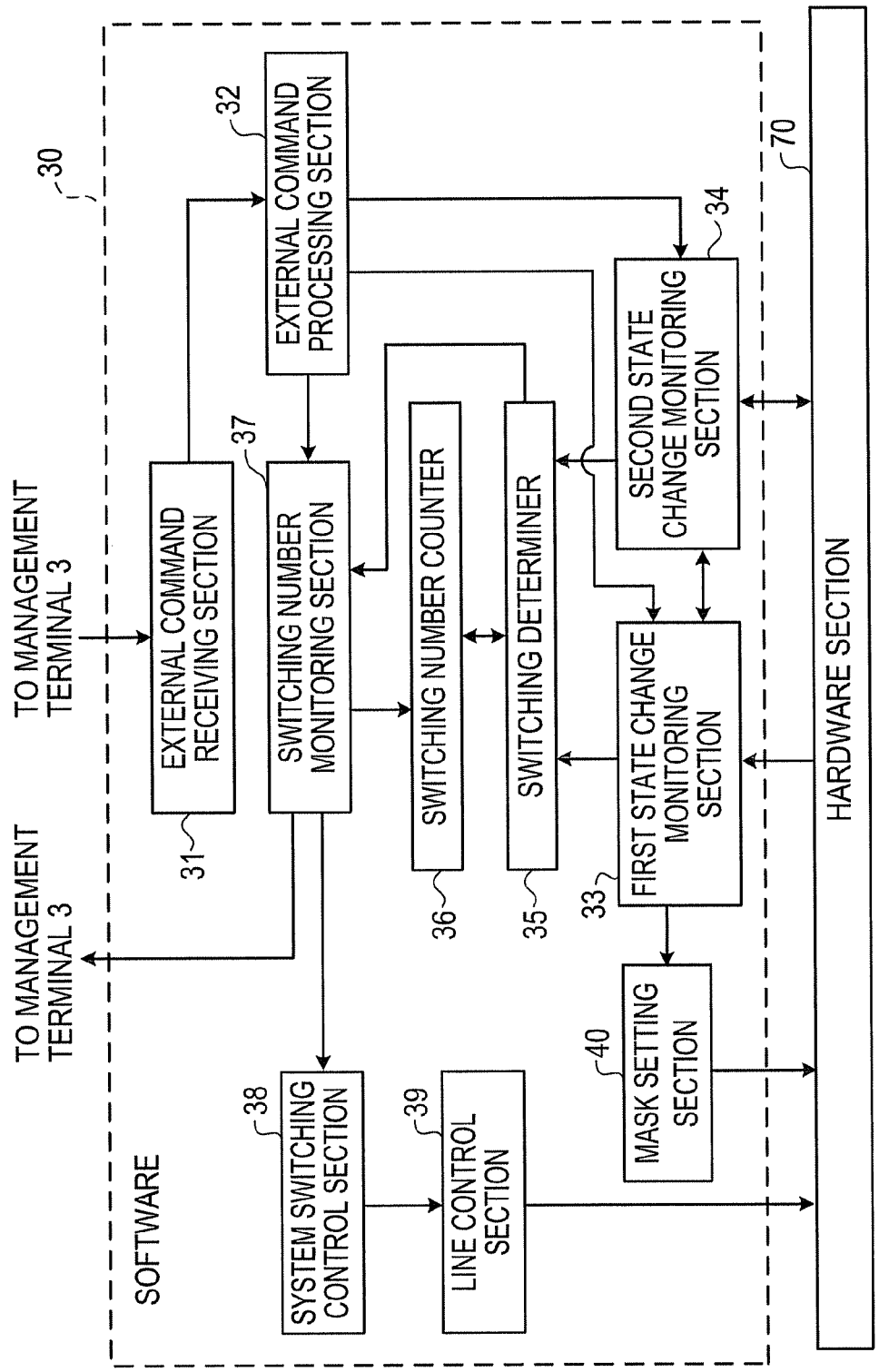

LINE MONITORING APPARATUS AND LINE MONITORING METHOD

CROSS-REFERENCE TO RELATED APPLICATIONS

This application is based upon and claims the benefit of priority of the prior Japanese Patent Application No. 2008-69491, filed on Mar. 18, 2008, the entire contents of which are incorporated herein by reference.

BACKGROUND

1. Field

The embodiments discussed herein are related to a line monitoring apparatus and a line monitoring method, which monitor the state of a line transmitting a signal.

2. Description of the Related Art

A redundant set is configured with a plurality of lines in a communication system in which high reliability is required. When a line monitoring apparatus for monitoring the state of a line detects an abnormality in a line that is in use, the line monitoring apparatus uses, instead of the line in use, a standby line belonging to the same redundant set as the line in use in which the abnormality occurred. In this way the down time can be shortened.

A hardware interrupt may be used for a process in which a state change in the line is detected by the line monitoring apparatus. The hardware interrupt may be used in order for the process to cope with the state change to be performed with high priority by the line monitoring apparatus, when a state change in the line is detected by the line monitoring apparatus. When a detector detects the state change in the line, the detector supplies an interrupt signal to the line monitoring apparatus, so as to thereby enable the line monitoring apparatus to promptly detect the state change in the line.

Related techniques are described in Japanese Laid-open Patent Publication No. 05-300195.

SUMMARY

According to an aspect of the invention, a line monitoring apparatus includes a state change detection number counter configured to count a state change detection number that is a number of a state change in a line being detected by a first type detecting process, and a state change frequency determiner configured to determine whether or not the state change detection number counted per a predetermined unit time exceeds a predetermined threshold value, wherein when the state change detection number counted per the unit time exceeds the threshold value, the detecting process of detecting a state change in the line is changed from the first type detecting process to a second type detecting process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

The above-described embodiments of the present invention are intended as examples, and all embodiments of the present invention are not limited to including the features described above.

BRIEF DESCRIPTION OF THE DRAWINGS

FIG. 4 is functional blocks realized by a line monitoring program;

DETAILED DESCRIPTION OF THE PREFERRED EMBODIMENTS

Figure 1:
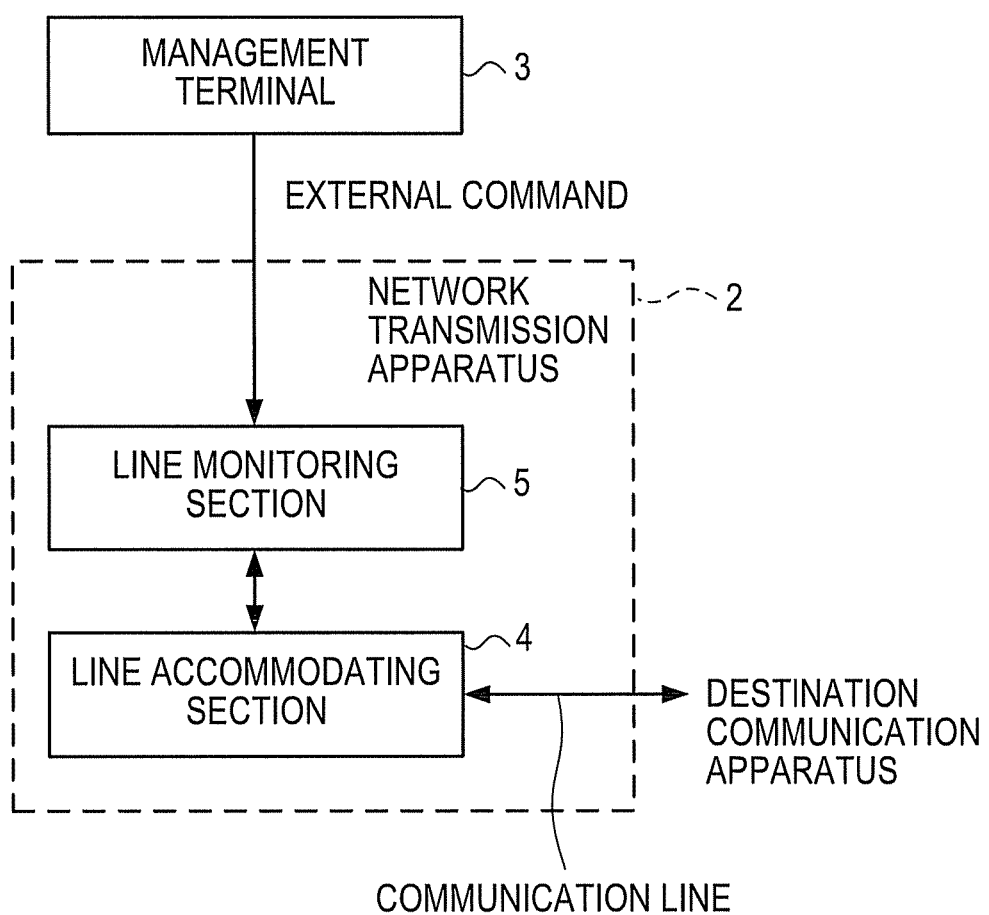
FIG. 1 is an example of an entire configuration of a communication system.

Reference may now be made in detail to embodiments of the present invention, examples of which are illustrated in the accompanying drawings, wherein like reference numerals refer to like elements throughout.

In the line monitoring method using the hardware interrupt as described above, when the line state becomes unstable, a state change requiring the switching of the line in use occurs frequently. The hardware interrupt is generated frequently upon detection of the state change in the line.

Thus, it is also conceivable that low priority processes other than the line switching are not executed. Such processes might be, for example, a command receiving process from an external apparatus, or a process to be periodically executed (for example, line state monitoring process). The line switching operation itself may not be performed when the state change is caused more frequently, because a subsequent interrupt is generated during the line switching operation.

For this reason, it is conceivable that there arises a case where it is not possible to grasp the present states, such as what kind of failure is caused, what is the cause of the failure, and how the failure can be restored, when the line state becomes unstable so as to prevent the line monitoring apparatus from performing the expected operations.

An embodiment will be described with reference to the accompanying drawings.

FIG. 1 is an example of an entire configuration of a communication system. A communication system 1 includes a network transmission apparatus 2, and a management terminal 3. The network transmission apparatus 2 performs transmission and reception of data to and from a destination communication apparatus via a communication line. The management terminal 3 is used for maintenance and management of the network transmission apparatus 2 by a system manager.

The network transmission apparatus 2 is connected to the destination communication apparatus by the communication line. The network transmission apparatus 2 includes a line accommodating section 4 (such as, for example, a communication interface card), and a line monitoring section 5. The line accommodating section 4 performs transmission and reception of data via the communication line. The line monitoring section 5 monitors the line state of the communication line accommodated in the line accommodating section 4.

The system manager may change the settings of the line monitoring section 5 by using the management terminal 3. The line monitoring section 5 includes a function of receiving an external command inputted from the management terminal 3, as will be described below. A protocol such as, for example, the TL-1 (Transaction Language 1) command, the CLI (Command Line Interface) command, or the SNMP (Simple Network Management Protocol) command, is used in the field of communication network transmission apparatuses. Thus, also in the present embodiment, a command based on such protocol may be used as the external command transmitted from the management terminal 3 to the network transmission apparatus 2.

Figure 2:
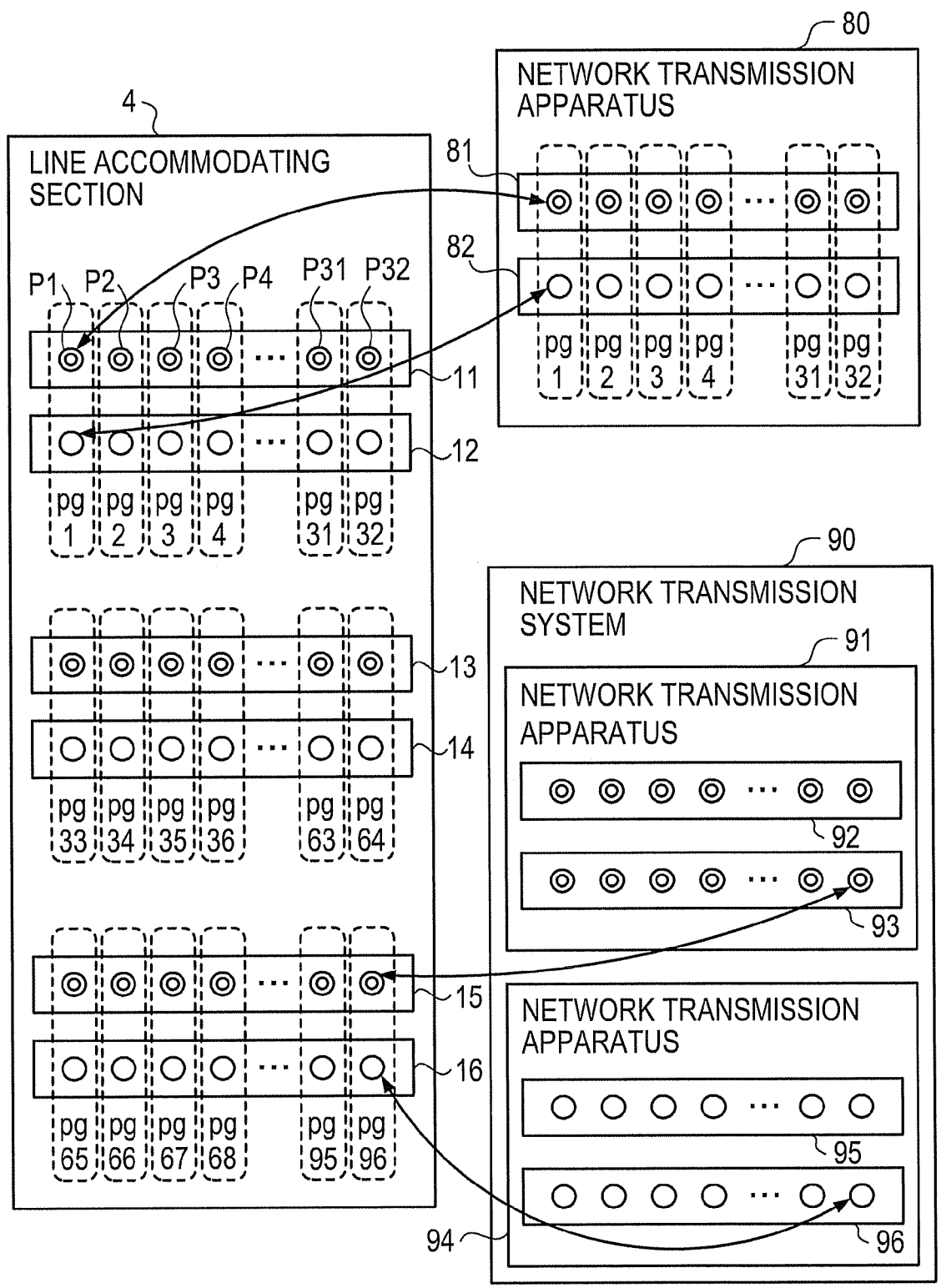
FIG. 2 is a connection example of communication lines in the communication system depicted in FIG. 1.

FIG. 2 is a connection example of communication lines in the communication system 1 depicted in FIG. 1. The communication lines connected to communication interface cards 11 to 16 are connected to a network transmission apparatus 80 and a network transmission system 90, each of which serves as a communication destination. The communication interface cards 11 to 16 are accommodated in the line accommodating section 4. The network transmission system 90 has a redundant configuration in which a plurality of network transmission apparatuses 91 and 94 are duplicated.

The line accommodating section 4 includes the communication interface cards 11 to 16. Each of the communication interface cards 11 to 16 includes 32 ports P1 to P32, and each of the ports is connected to a communication line.

The communication line connected to the communication interface card 11 is combined with the communication line connected to communication interface card 12. The communication line connected to the communication interface card 13 is combined with the communication line connected to the communication interface card 14. The communication line connected to the communication interface card 15 is combined with the communication line connected to the communication interface card 16. Thus, duplicated (redundant) communication lines are configured by the combined two lines. For example, in FIG. 2, a double circle mark indicates an active system line, and a single circle mark indicates a standby system line.

Reference character "pgi" (i is an integer) in the figure represents one redundant set. For example, in the case of the communication interface card of the line accommodating section 4, one redundant set is configured by an active system communication line and a standby system communication line which are included in pg1. In the example depicted in FIG. 2, 96 redundant sets of pg1 to pg96 are provided by the line accommodating section 4.

The connection relation of the communication lines is as follows. An active system line of the communication interface card 11 in the line accommodating section 4 is connected to an active system line of a communication interface card 81 in the network transmission apparatus 80 serving as a communication counterpart. A standby system line of the communication interface card 12 in the line accommodating section 4 is connected to a standby system line of a communication interface card 82 in the network transmission apparatus 80.

Further, an active system line of the communication interface card 15 in the line accommodating section 4 is connected to a communication interface card 93 of the active system network transmission apparatus 91 in the network transmission system 90 serving as a communication counterpart. A standby system line of the communication interface card 16 in the line accommodating section 4 is connected to a communication interface card 96 of the standby system network transmission apparatus 94 in the network transmission system 90.

Figure 3:
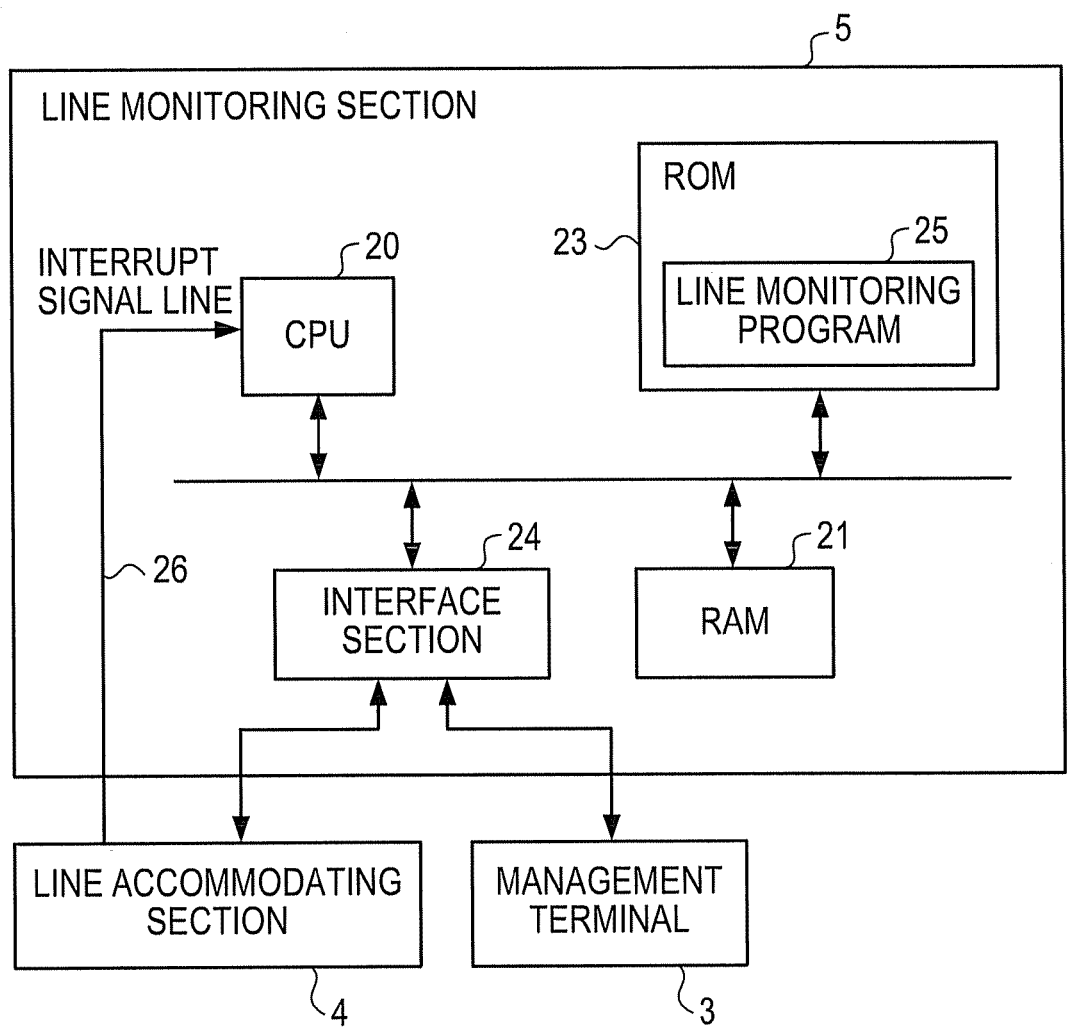
FIG. 3 is a hardware configuration in the case where the line monitoring section depicted in FIG. 1 is realized by using a CPU.

FIG. 3 is a hardware configuration in the case where the line monitoring section 5 depicted in FIG. 1 is realized by using a CPU. The line monitoring section 5 includes a CPU 20, a memory (RAM) 21 a memory (ROM) 23 which stores the program executed by the CPU 20, and an interface section 24. A program executed by the CPU 20 is loaded in RAM 21. The RAM 21 also stores data necessary for execution of the program. The interface section 24 performs transmission and reception of a signal to and from the management terminal 3 and the line accommodating section 4.

A line monitoring program 25 is stored in the ROM 23. The line monitoring program 25 is executed by the CPU 20. The line monitoring section 5 performs a line monitoring process of monitoring a state change in the communication line connected to the line accommodating section 4. The contents of the line monitoring process will be described below. Note that instead of the ROM 23, the line monitoring program 25 may also be stored in a nonvolatile memory such as a flash memory or in a storage device, such as a hard disk apparatus, so as to be read out by the CPU 20.

An interrupt signal from the line accommodating section 4 is inputted into the CPU 20 via an interrupt signal line 26. The line accommodating section 4 generates an interrupt signal, if a state change, such as an "occurrence of failure" or a "restoration of failure", is caused in one of the communication lines connected to the accommodating section 4. The line accommodating section 4 also reports the state change to the CPU 20. This enables the CPU 20 to execute a hardware interrupt process at the time when the state change is caused in the communication line.

FIG. 4 is a functional block diagram of respective functions which are realized by execution of the line monitoring program 25 by the CPU 20 and which are performed by the line monitoring section 5. A software section 30 is realized by execution of the line monitoring program 25. The software section 30 includes an external command receiving section 31, an external command processing section 32, a first state change monitoring section 33, a second state change monitoring section 34, a switching determiner 35, a switching number counter 36, a switching number monitoring section 37, a system switching control section 38, and a line control section 39. The software section 30 monitors a state change in the communication line connected to the line accommodating section 4 in cooperation with a hardware section 70. The hardware section 70 configures the line accommodating section 4 and the line monitoring section 5.

Figure 5A:
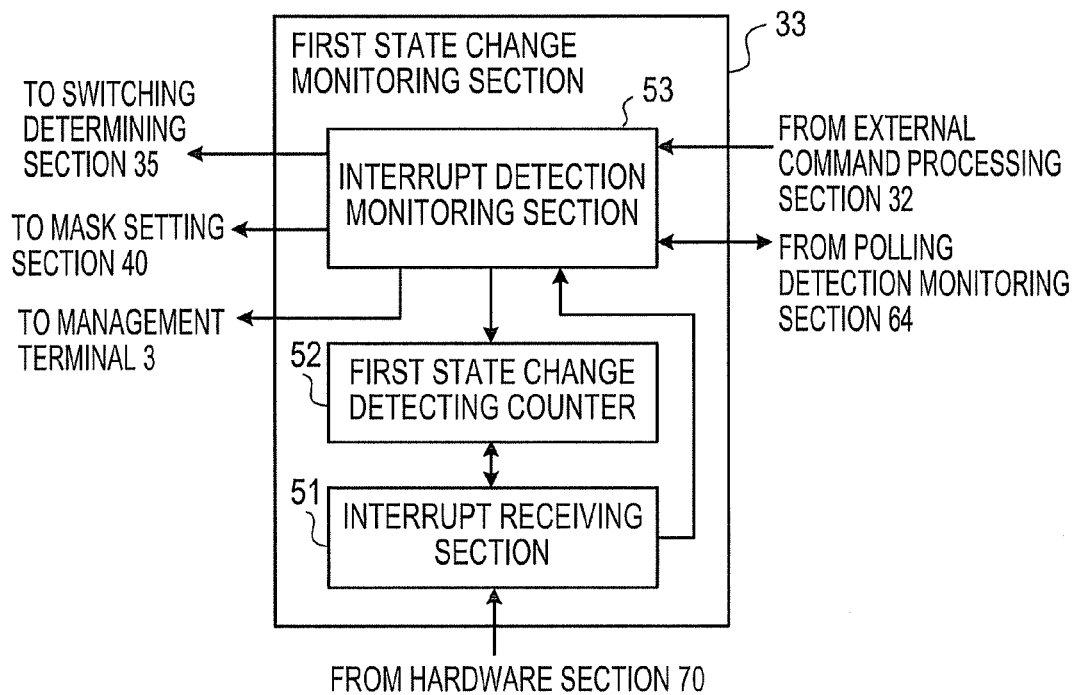
FIG. 5A is a functional block diagram of a first state change monitoring section.
Figure 5B:
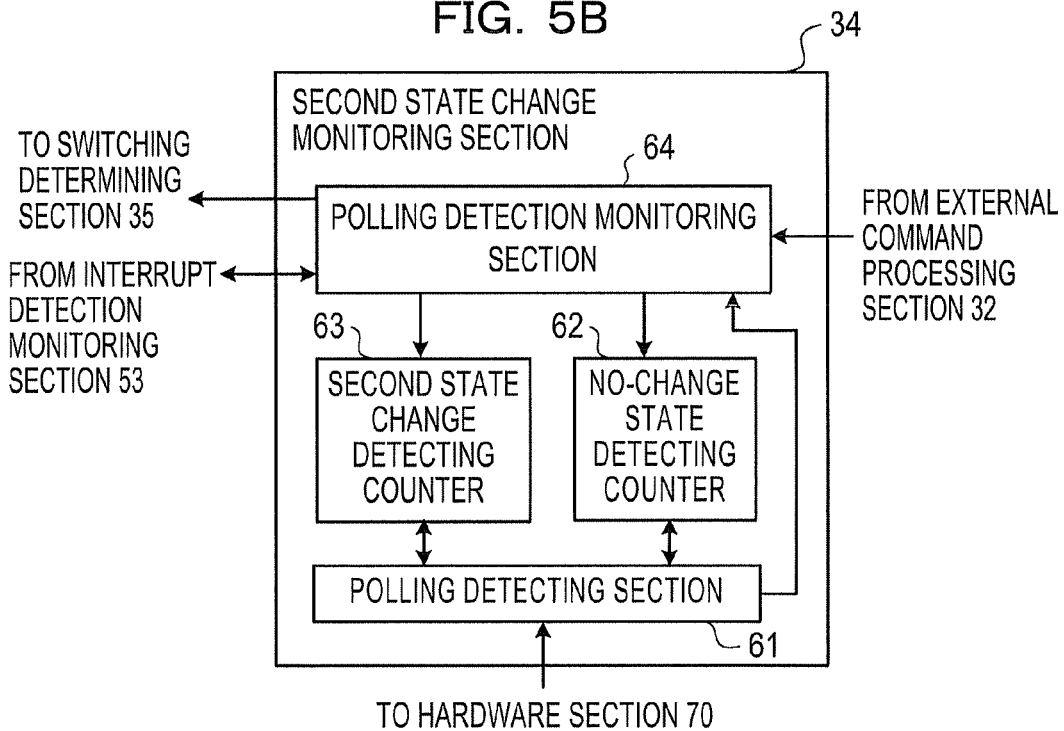
FIG. 5B is a functional block diagram of a second state change monitoring section.

FIG. 5A is a functional block diagram of the first state change monitoring section 33. FIG. 5B is a functional block diagram of the second state change monitoring section 34. The first state change monitoring section 33 includes an interrupt receiving section 51, a first state change detecting counter 52, and an interrupt detection monitoring section 53. The second state change monitoring section 34 includes a polling detecting section 61, a no-change state detecting counter 62, a second state change detecting counter 63, and a polling detection monitoring section 64.

In the following, there will be described an operation of each of the function blocks depicted in FIG. 4, FIG. 5A, and FIG. 5B with reference to flow charts depicted in FIG. 6 to FIG. 11. The flow charts depicted in FIG. 6 to FIG. 11 are flow charts of the monitoring process for one communication line accommodated in the line accommodating section 4.

Here, there will be described the monitoring process performed for the communication line connected to the first port P1 of the communication interface card 11 accommodated in the line accommodating section 4 depicted in FIG. 2, but the same process is performed for the other interface card and the other port.

Figure 6:
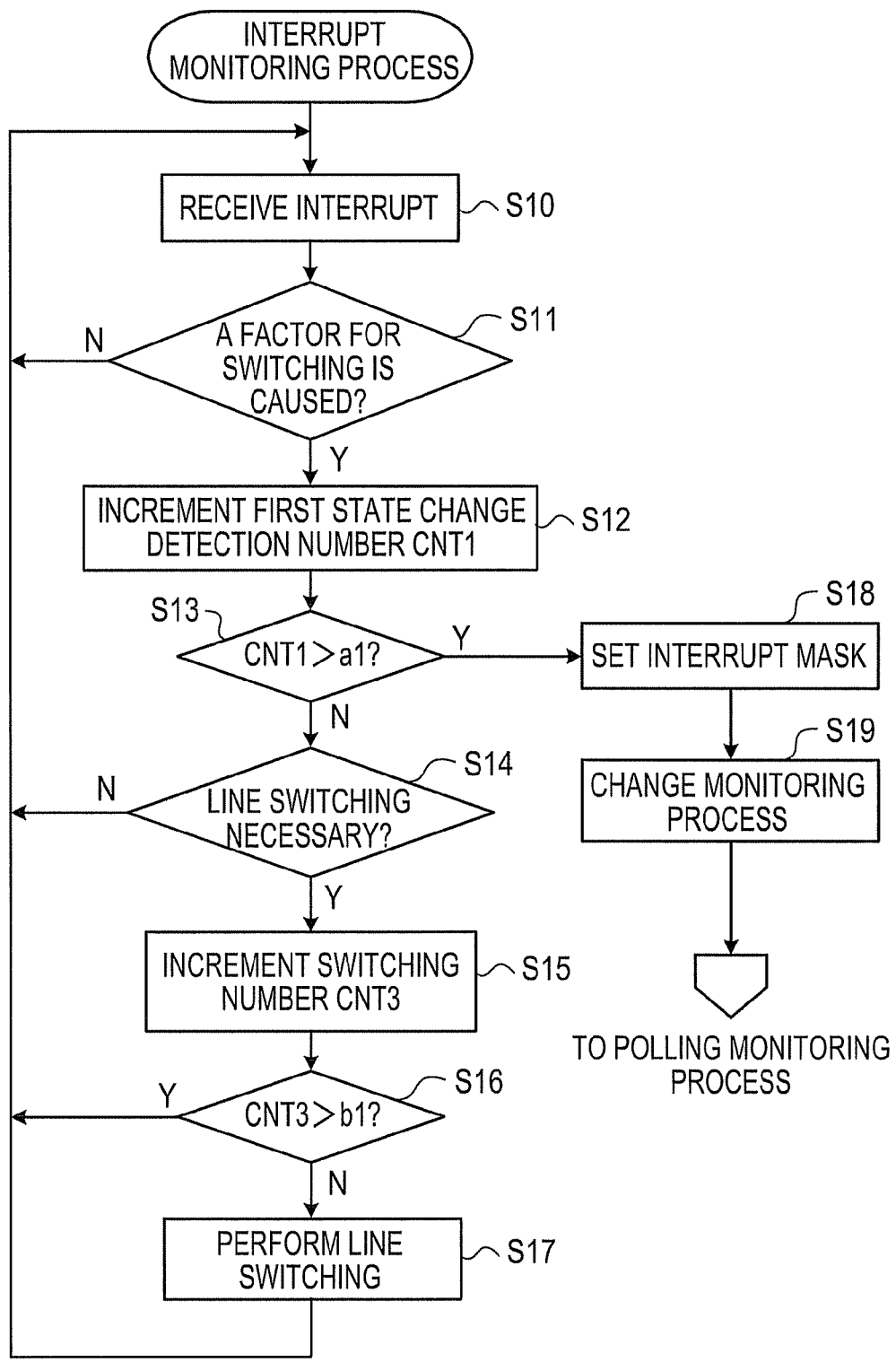
FIG. 6 is a flow chart of a monitoring process by a hardware interrupt.

FIG. 6 is a flow chart for explaining an operation at the time when the line monitoring section 5 performs the monitoring process based on a hardware interrupt. Here, there is considered a case where a line state detecting part (not depicted) on the communication interface card 11 detects a state change, so as to generate a hardware interrupt signal.

When detecting a state change in the line of the port P1, the hardware section 70 depicted in FIG. 4 transmits a state change interrupt notification to the first state change monitoring section 33 by the hardware interrupt. In operation S10, the state change interrupt notification is received by the interrupt receiving section 51 of the first state change monitoring section 33 depicted in FIG. 5A.

In operation S11, the interrupt receiving section 51 determines whether or not it is necessary to switch the line in use between the active system line and the standby system line in the redundant set pg1 on the basis of a factor of generating the interrupt. When the switching of the line is not necessary, the interrupt receiving section 51 returns the process to operation S10. When the switching of the line is necessary, the interrupt receiving section 5 makes the process proceed to operation S12.

In operation S12, the first state change detecting counter 52 increments by "one" the value of a first state change detection number CNT1 counted for the communication line in the first port P1 of the communication interface card 11. The first state change detecting counter 52 counts the value of the first state change detection number CNT1 for each of the lines in each of the redundant sets connected to the line accommodating section 4. In operation S13, the interrupt detection monitoring section 53 determines whether or not the first state change detection number CNT1 exceeds a predetermined first threshold value a1. In the present embodiment, it is assumed that the first threshold value a1 is set, for example, to "30 times".

As a result of the determination in operation S13, when the first state change detection number CNT1 does not exceed the first threshold value a1, the interrupt detection monitoring section 53 transmits switching request signal to the switching determiner 35 depicted in FIG. 4. The switching request signal requests that the line used in the redundant set pg1 be changed from the active system line connected to the first port P1 of the communication interface card 11 to the standby system line connected to the first port of the communication interface card 12.

In operation S14, the switching determiner 35 determines whether or not it is necessary to switch the line in use in the redundant set pg1. For example, the switching determiner 35 determines that the switching of the line in use is not necessary if the standby line of the standby system is also in failure, even in the case where a failure is generated in the active system line used at present. Further, for example, the switching determiner 35 also determines that the switching of the line in use is not necessary if a state change is caused in a communication line currently in standby determiner.

As a result of the determination in operation S14, when determining that the switching of the line in use is not necessary, the switching determiner 35 returns the process to operation S10. When determining that the switching of the line in use is necessary, the switching determiner 35 makes the process proceed to operation S15.

In operation S15, the switching number counter 36 increments by "one" a switching number CNT3 counted for the redundant set pg1. The switching number counter 36 counts the switching number CNT3 for each of the redundant sets connected to the line accommodating section 4.

In operation S16, the switching number monitoring section 37 determines whether or not the value of the switching number CNT3 exceeds a predetermined third threshold value b1. In the present embodiment, it is assumed that the third threshold value b1 is set, for example, to "30 times".

In operation S17, the switching number monitoring section 37 outputs a switching request signal relating to the redundant set pg1 to the system switching control section 38 if the value of the switching number CNT3 does not exceed the predetermined third threshold value b1.

The system switching control section 38 performs switching control for selecting a line to be used from the active system line and the standby system line in each of the redundant sets of pg1 to pg96. The line control section 39 performs the switching between the lines in the redundant set pg1 according to the control of the system switching control section 38 which has received the switching request signal relating to the redundant set pg1. Thereby, the line used in the redundant set pg1 is switched from the active system line to the standby system line.

On the other hand, when the value of the switching number CNT3 exceeds the predetermined third threshold value b1 in the determination in operation S16, the switching number monitoring section 37 returns the processing to operation S10.

Figure 7:
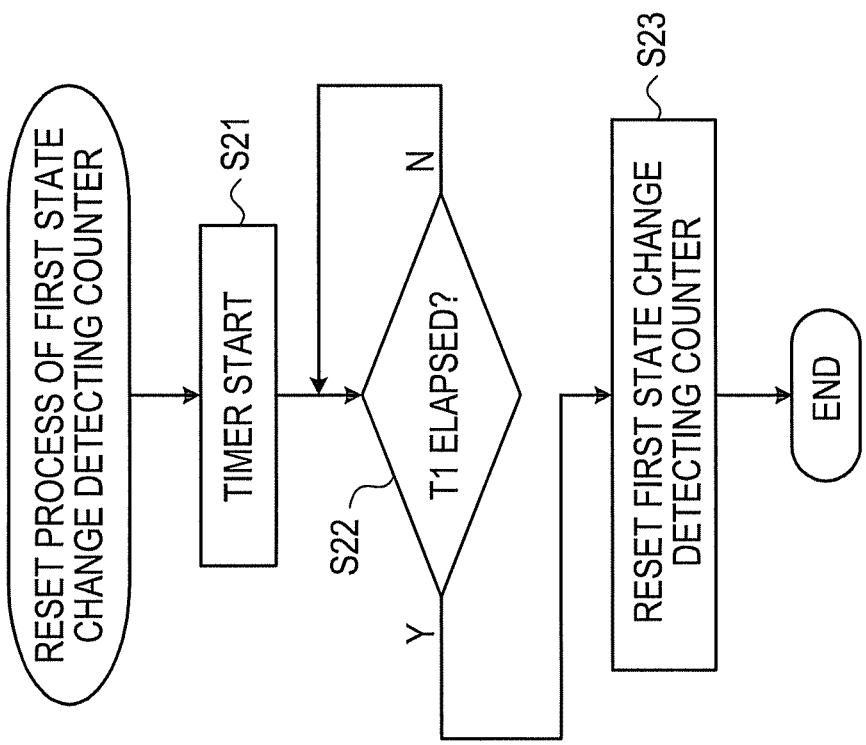
FIG. 7 is a flow chart of a reset process of a first state change detecting counter.

FIG. 7 is a flow chart of a reset process of the first state change detecting counter 52. The interrupt detection monitoring section 53 of the first state change monitoring section 33 depicted in FIG. 5A includes a first timer (not depicted), and starts the first timer in operation S21.

In operation S22, the interrupt detection monitoring section 53 determines whether or not the time measured by the first timer exceeds a predetermined first unit time t1. The interrupt detection monitoring section 53 resets the first state change detecting counter 52 if the time measured by the first timer exceeds the predetermined first unit time t1, so as to set the value of the first state change detection number CNT1 to "0" (operation S23). In this way, the interrupt detection monitoring section 53 resets, at the period of t1, the value of the first state change detection number CNT1 to "0".

For this reason, when the hardware interrupt reporting a state change in a certain communication line is generated more than a1 times within the first unit time t1, the first state change detection number CNT1 exceeds the first threshold value a1 in the determining operation S13 depicted in FIG. 6, so that the process is shifted to operation S18. In the other case, the process is shifted to S14. In the present embodiment, it is assumed that the first unit time t1 is set, for example, to "1 second".

In the following, there will be described a process in the case where the first state change detection number CNT1 exceeds the first threshold value a1 in the determining operation S13.

In operation S18, the interrupt detection monitoring section 53 requests a mask setting section 40 to perform a process to mask the hardware interrupt due to the state change in the line (in this case, the line connected to the first port P1 of the communication interface card 11) for which the value of the first state change detection number CNT1 exceeds the first threshold value a1. The interrupt signal from the hardware section 70 is canceled by the mask process performed by the mask setting section 40.

In operation S19, the interrupt detection monitoring section 53 reports, to the polling detection monitoring section 64 of the second state change monitoring section 34 depicted in FIG. 5B, that the state change monitoring of the line connected to the first port P1 of the communication interface card 11 is subsequently performed not by the hardware interrupt process but by a polling process. At this time, the interrupt detection monitoring section 53 resets the value of the first state change detection number CNT1 to "0".

Further, the interrupt detection monitoring section 53 outputs, to an external apparatus, such as the management terminal 3, an alarm reporting that the state change monitoring process of the line is changed to the polling process. Subsequently, the process is shifted to the monitoring process performed by the polling as depicted in FIG. 8.

In this way, in the present embodiment, when the hardware interrupt for reporting a state change in a certain communication line is generated a1 times during the first unit time t1. That is, when the frequency of hardware interrupt exceeds a fixed value, the state change monitoring process of the communication line is changed to the polling process.

Figure 8:
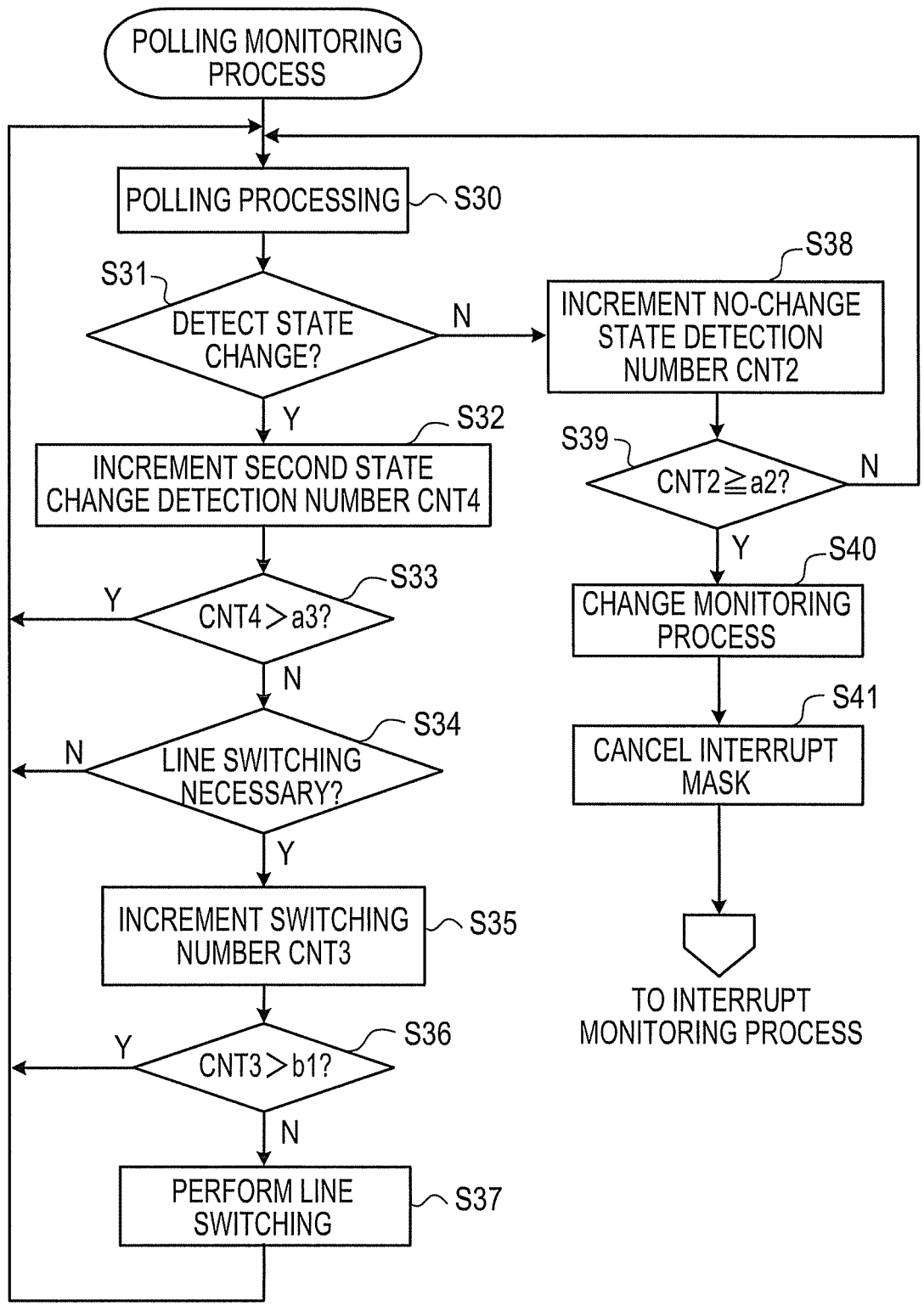
FIG. 8 is a flow chart of a monitoring process by polling.

FIG. 8 is a flow chart for explaining an operation at the time when the line monitoring section 5 performs the monitoring process by the polling. In operation S30, the polling detecting section 61 of the second state change monitoring section 34 depicted in FIG. 5B detects a state change in the line connected to the first port P1 of the communication interface card 11 at a predetermined polling period. In the present embodiment, the polling period is set to "100 ms".

When the polling detecting section 61 detects a state change in the line in operation S31, then in operation S32, the second state change detecting counter 63 increments by "one" the value of a second state change detection number CNT4 which is counted for the communication line in the first port P1 of the communication interface card 11. The second state change detecting counter 63 counts the value of the second state change detection number CNT4 for each of the lines in each of the redundant sets connected to the line accommodating section 4.

In operation S33, the polling detection monitoring section 64 determines whether or not the second state change detection number CNT4 exceeds a predetermined fourth threshold value a3. In the present embodiment, it is assumed that the fourth threshold value a3 is set, for example, to "30 times".

As a result of the determination in operation S33, when the second state change detection number CNT4 exceeds the fourth threshold value a3, the polling detection monitoring section 64 returns the process to operation S30. On the other hand, when the second state change detection number CNT4 does not exceed the fourth threshold value a3, the polling detection monitoring section 64 transmits a switching request signal to the switching determiner 35 depicted in FIG. 4. The switching request a signal requests that the line used in the redundant set pg1 be changed from the active system line connected to the first port P1 of the communication interface card 11 to the standby system line connected to the first port of the communication interface card 12.

In operation S34, the switching determiner 35 determines whether or not it is necessary to switch the line used in the redundant set pg1. The reference for determination of the necessity of switching may be the same as the reference for determination which is used in operation S14 as described above. As a result of the determination in operation S34, when determining that it is not necessary to switch the line in use, the switching determiner 35 returns the process to operation S30. When determining that it is necessary to switch the line in use, the switching determiner 35 makes the process proceed to operation S35.

In operation S35, the switching number counter 36 increments by "one" the value of the switching number CNT3 counted for the redundant set pg1. In operation S36, the switching number monitoring section 37 determines whether or not the value of the switching number CNT3 exceeds the predetermined third threshold value b1.

When the value of the switching number CNT3 does not exceed the predetermined third threshold value b1, then in operation S37, the switching number monitoring section 37 outputs the switching request signal relating to the redundant set pg1 to the system switching control section 38. As a result, the line used in the redundant set pg1 is changed from the active system line to the standby system line.

Figure 9:
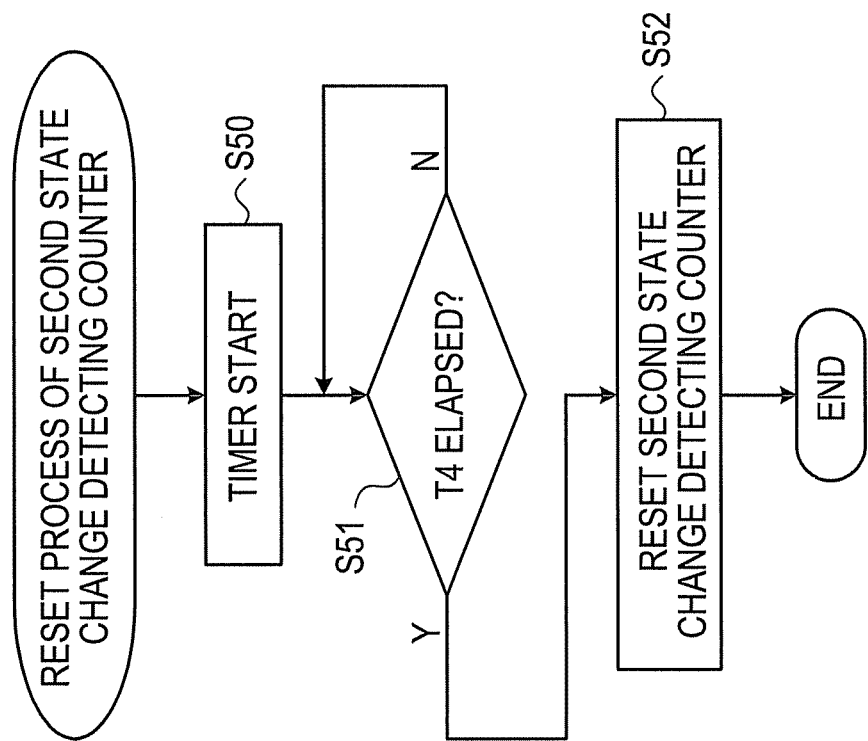
FIG. 9 is a flow chart of a reset process of a second state change detecting counter.

The polling detection monitoring section 64 also includes a function to perform a reset process of the second state change detecting counter 63. FIG. 9 is a flow chart of the reset process of the second state change detecting counter 63. The polling detection monitoring section 64 includes a fourth timer (not shown), and starts the fourth timer in operation S50.

In operation S51, the polling detection monitoring section 64 determines whether or not the time measured by the fourth timer exceeds a predetermined third unit time t4. When the time measured by the fourth timer exceeds the predetermined third unit time t4, the polling detection monitoring section 64 resets the second state change detecting counter 63, so as to set the value of the second state change detection number CNT4 to "0" (operation S52). In this way, the polling detection monitoring section 64 resets, at the period of t4, the value of the second state change detection number CNT4 to "0".

For this reason, when the number of state changes detected in a certain communication line by the polling process within the third unit time t4 exceeds the fourth threshold value a3, the process is returned to operation S30. In this case, the process of switching the line in use, which process is performed in operations S34 to S37, is not performed.

For this reason, when a state change is frequently caused while the line monitoring process is performed by the polling process shown in FIG. 8, the switching of the line in use in the redundant set is suppressed. In the present embodiment, it is assumed that the third unit time t4 is set, for example, to "1 second".

Returning to FIG. 8, when the polling detecting section 61 detects no state change in the line in operation S31, the process is shifted to operation S38.

In operation S38, the no-change state detecting counter 62 increments by "one" the value of a no-change state detection number CNT2 counted for the communication line in the first port P1 of the communication interface card 11. The no-change state detecting counter 62 counts the value of the no-change state detection number CNT2 for each of the lines in each of the redundant sets connected to the line accommodating section 4.

In operation S39, the polling detection monitoring section 64 determines whether or not the value of the no-change state detection number CNT2 is a predetermined second threshold value a2 or more. In the present embodiment, it is assumed that the second threshold value a2 is set, for example to "10 times". When the no-change state detection number CNT2 is less than the second threshold value a2, the process is returned to operation S30. On the other hand, when the no-change state detection number CNT2 is the second threshold value a2 or more, the process is made to proceed to operation S40.

In operation S40, the polling detection monitoring section 64 reports, to the interrupt detection monitoring section 53 of the first state change monitoring section 33 shown in FIG. 5A, that the state change monitoring of the line connected to the first port P1 of the communication interface card 11 is subsequently performed not by the polling process but by the hardware interrupt process.

In operation S41, the interrupt detection monitoring section 53, which has received the notification, requests the mask setting section 40 to cancel the mask of hardware interrupt for a state change in the line. At this time, the polling detection monitoring section 64 resets the values of the second state change detection number CNT4 and of the no-change state detection number CNT2 to "0". Thereafter, the process is shifted to the monitoring process by the hardware interrupt shown in FIG. 6.

Figure 10:
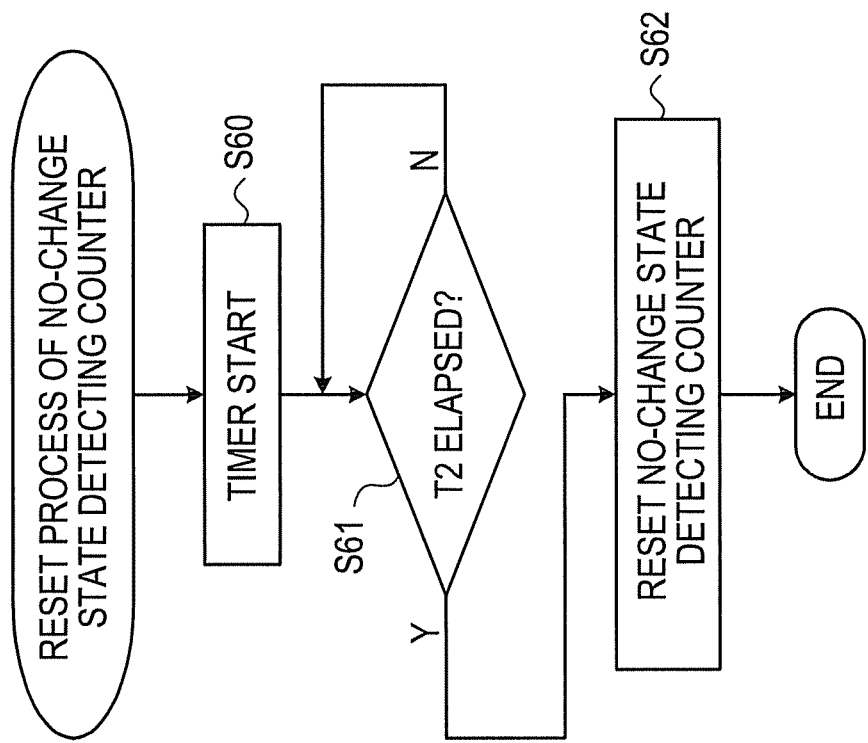
FIG. 10 is a flow chart of a reset process of a no-change state detecting counter.

FIG. 10 is a flow chart showing a reset process of the no-change state detecting counter 62 shown in FIG. 5B. The polling detection monitoring section 64 includes a second timer (not shown), and starts the second timer in operation S60.

In operation S61, the polling detection monitoring section 64 determines whether or not the time measured by the second timer exceeds a predetermined unit time t2. The polling detection monitoring section 64 resets the no-change state detecting counter 62 if the time measured by the second timer exceeds the predetermined second unit time t2, so as to set the value of the no-change state detection number CNT2 to "0" (operation S62). In this way, the polling detection monitoring section 64 resets, at the period of t2, the no-change state detection number CNT2 to "0".

For this reason, the line monitoring process is shifted from the polling process to the hardware interrupt process only when the number of no state change being detected in a certain communication line by the detection by polling within the second unit time t2 is a2 or more. In the other case, the polling process is continued. In the present embodiment, it is assumed that the second unit time t2 is set, for example, to "1 second".

Here, in particular, in the case where, as described above, the second unit time t2 is set to 1 second, where the second threshold value a2 is set to 10 times, and where the polling period of the polling process performed by the polling detecting section 61 is set to 100 ms, the line monitoring process is shifted from the polling process to the hardware interrupt process only when no state change is detected in the communication line by the detection by polling during the second unit time t2.

Figure 11:
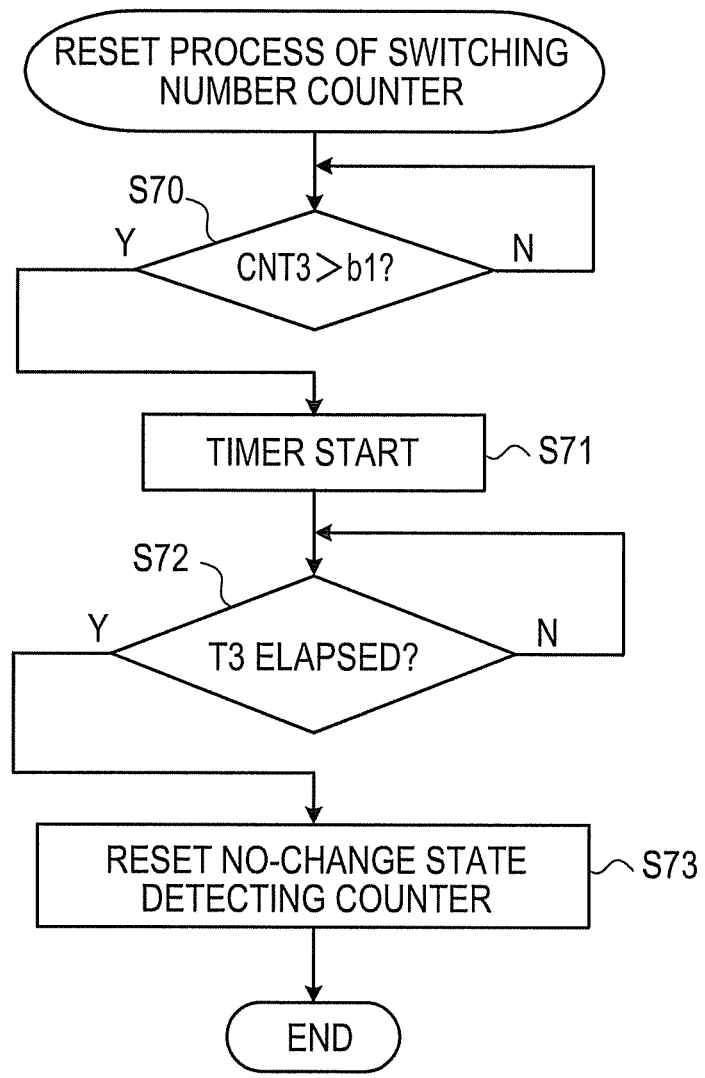
FIG. 11 is a flow chart of a reset process of a switching number counter.

FIG. 11 is a flow chart showing a reset process of the switching number counter 36. When detecting that the switching number CNT3 exceeds the third threshold value b1, the switching number monitoring section 37 resets the value of the switching number CNT3 to "0" after the lapse of a predetermined stop period t3.

In operation S70, the switching number monitoring section 37 determines whether or not the switching number CNT3 exceeds the third threshold value b1. When the switching number CNT3 does not exceed the third threshold value b1, the switching number monitoring section 37 returns the process to the beginning of the process. When the switching number CNT3 exceeds the third threshold value b1, the switching number monitoring section 37 starts a third timer (not shown) (operation S71).

While the switching number CNT3 exceeds the third threshold value b1 as will be described below, the switching process of the line used in the redundant set pg1, which process is performed by the system switching control section 38, is stopped. At this time, the switching number monitoring section 37 outputs, to the external apparatus, such as the management terminal 3, an alarm for reporting that the switching process of the line used in the redundant set pg1 is stopped.

In operation S72, the switching number monitoring section 37 determines whether or not the time measured by the third timer exceeds the predetermined stop period t3. When the time measured by the third timer exceeds the predetermined stop period t3, the switching number monitoring section 37 resets the switching number counter 36, so as to set the value of the switching number CNT3 to "0" (operation S73). In the present embodiment, it is assumed that the stop period t3 is set, for example to "1 second".

Therefore, in operation S15 shown in FIG. 6, when the switching number CNT3 exceeds the third threshold value b1 due to the increase of "1" in the value of the switching number CNT3, the determination result in operation S16 is set to "Y" during the subsequent stop period t3. The switching process of the line in use in operation S17 is suppressed during the stop period.

Similarly, when the switching number CNT3 exceeds the third threshold value b1 due to the increase of "1" in the value of the switching number CNT3 in operation S35 shown in FIG. 8, the determination result in operation S36 is set to "Y" during the subsequent stop period t3. The switching process of the line in use in operation S37 is suppressed during the stop period.

Note that in the present embodiment, it is assumed that the interrupt receiving section 51 of the first state change monitoring section 33 shown in FIG. 5A and the polling detecting section 61 of the second state change monitoring section 34 are realized by the line monitoring program 25 operated on the line monitoring section 5. Alternatively, both or one of the processes of the interrupt receiving section 51 and the polling detecting section 61 may be performed by the program executed on the line accommodating section 4.

Further, the threshold values a1, a2, a3 and b1, the unit times t1, t2 and t4, the stop period t3, and the setting value of polling period, as described above, may be changed by an external command from the management terminal 3.

The external command which instructs to change the above described setting values is received by the external command receiving section 31 shown in FIG. 4, and the contents of the command are interpreted by the external command processing section 32.

When the external command includes an instruction to change the first threshold value a1 or the first unit time t1, the external command processing section 32 performs a process to change the setting value which is used by the interrupt detection monitoring section 53 shown in FIG. 5A.

When the external command includes an instruction to change the second threshold value a2, the second unit time t2, the fourth threshold value a3, or the third unit time t4, the external command processing section 32 performs a process to change the setting value which is used by the polling detection monitoring section 64 shown in FIG. 5B.

When the external command includes an instruction to change the third threshold value b1 or the stop period t3, the external command processing section 32 performs a process to change the setting value which is used by the switching number monitoring section 37 shown in FIG. 4.

In this way, since the present embodiment is configured such that the values of the threshold values a1, a2, a3 and b1, the values of the unit times t1, t2, t4, and the stop period t3 may be changed by the user, it is possible to achieve a flexible operation according to the network design.

As described above, according to the present embodiment, even when a state change is frequently caused in a line to be monitored, the line monitoring apparatus is enabled to perform a process other than the process of coping with the state change in the line.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A line monitoring apparatus comprising:
    a state change detection number counter configured to count a state change detection number that is a number of a state change in a line being detected by a first type detecting process; and
    a state change frequency determiner configured to determine whether or not the state change detection number counted per a predetermined unit time exceeds a predetermined threshold value,
    wherein when the state change detection number counted per the unit time exceeds the threshold value, the detecting process of detecting a state change in the line is changed from the first type detecting process to a second type detecting process, and
    wherein the first type detecting process is a process of detecting a state change in the line by a hardware interrupt, and wherein the second type detecting process is a process of detecting a state change in the line by polling.

2. The line monitoring apparatus according to claim 1, further comprising:
    in a case where the unit time is set as a first unit time, where the state change frequency determiner is set as a first state change frequency determiner, and where the threshold value is set as a first threshold value,
    a no-change state detection number counter configured to count a no-change state detection number that is a number of no state change being detected in the line by the second type detecting process; and
    a second state change frequency determiner configured to determine whether or not the no-change state detection number counted per a predetermined second unit time exceeds a second predetermined threshold value,
    wherein when the no-change state detection number counted per the second unit time exceeds the second threshold value, the detecting process of detecting a state change in the line is changed from the second type detecting process to the first type detecting process.

3. The line monitoring apparatus according to claim 1, further comprising,
    in a case where the unit time is set as a first unit time, and where the state change frequency determiner is set as a first state change frequency determiner,
    a second state change frequency determiner configured to determine whether or not a state change in the line is detected by the second type detecting process within a predetermined second unit time,
    wherein when no state change in the line is detected by the second type detecting process within the second unit time, the detecting process of detecting a state change in the line is changed from the second type detecting process to the first type detecting process.

4. The line monitoring apparatus according to claim 1, configured such that at least one of the first threshold value, the second threshold value, the first unit time, and the second unit times can be changed.

5. The line monitoring apparatus according to claim 1, wherein when the detecting process of detecting a state change in the line is changed from the first type detecting process to the second type detecting process, an alarm is produced.

6. The line monitoring apparatus according to claim 1, further comprising:
    a line switching number counter configured to count a line switching number that is a number of, among the lines included in a redundant set formed by combining a plurality of the lines, the line in use being switched due to a state change in the line included in the redundant set; and
    a switching frequency determiner configured to determine whether or not the line switching number counted per a predetermined third unit time exceeds a predetermined third threshold value,
    wherein when the line switching number counted per the third unit time exceeds the third threshold value, the switching operation of the line in use in the redundant set is stopped during a predetermined stop period.

7. The line monitoring apparatus according to claim 6, configured such that at least one of the third threshold value, the third unit time, and the stop period can be changed.

8. The line monitoring apparatus according to claim 6, wherein when the switching operation of the line in use in the redundant set is stopped, an alarm is produced.

9. A line monitoring method comprising:
    counting a state change detection number that is a number of a state change in a line being detected by a first type detecting process;
    determining whether or not the state change detection number counted per a predetermined unit time exceeds a predetermined threshold value; and
    changing the detecting process of detecting the state change in the line from the first type detecting process to a second type detecting process if the state change detection number counted per the unit time exceeds the threshold value,
    wherein the first type detecting process is a process of detecting a state change in the line by a hardware interrupt, and wherein the second type detecting process is a process of detecting a state change in the line by polling.

10. The line monitoring method according to claim 9, further comprising:
    setting the unit time as a first unit time;
    setting the threshold value as a first threshold value;
    counting a no-change state detection number that is a number of no state change being detected in the line by the second type detecting process;
    determining whether or not the no-change state detection number counted per a predetermined second unit time exceeds a predetermined second threshold value; and
    changing the detecting process of detecting the state change in the line from the second type detecting process to the first type detecting process if the no-change state detection number counted per the second unit time exceeds the second threshold value.

11. The line monitoring method according to claim 9, further comprising:
setting the unit time as a first unit time,
determining whether or not the state change in the line is detected by the second type detecting process within a predetermined second unit time; and
changing the detecting process of detecting the state change in the line from the second type detecting process to the first type detecting process if no state change is detected in the line by the second type detecting process within the second unit time.

12. The line monitoring method according to claim 9, further comprising
changing at least one of the first threshold value, the second threshold value, the first unit time, and the second unit time in correspondence with a line to be monitored.

13. The line monitoring method according to claim 9, further comprising
producing an alarm at the time when the detecting process of detecting a state change in the line is changed from the first type detecting process to the second type detecting process.

14. The line monitoring method according to claim 9, further comprising:
counting a line switching number that is a number of, among the lines included in a redundant set formed by combining a plurality of the lines, the line in use being switched due to a state change in the line included in the redundant set;
determining whether or not the line switching number counted per a predetermined third unit time exceeds a predetermined third threshold value; and
stopping the switching operation of the line in use in the redundant set during a predetermined stop period if the line switching number counted per the third unit time exceeds the third threshold value.

15. The line monitoring method according to claim 14, further comprising
changing at least one of the third threshold value, the third unit time, and the stop period in correspondence with a redundant set to be monitored.

16. The line monitoring method according to claim 14, further comprising
producing an alarm at the time when the switching operation of the line in use in the redundant set is stopped.

17. The line monitoring method according to claim 9,
wherein the first type detecting process is a process of detecting a state change in the line by a hardware interrupt, and wherein the second type detecting process is a process of detecting a state change in the line by polling.

18. The line monitoring apparatus according to claim 1, wherein when the state change is detected in the line by the first type detecting process or the second type detecting process, transmission and reception of data is performed via a standby communication line.

19. The line monitoring method according to claim 9, wherein when the state change is detected in the line by the first type detecting process or the second type detecting process, transmission and reception of data is performed via a standby communication line.

20. A line monitoring apparatus, comprising:
a memory; and
a processor coupled to the memory, configured to
count a state change detection number that is a number of a state change in a line being detected by a first type detecting process,
determine whether or not the state change detection number counted per a unit time exceeds a threshold value, and
change a detecting process of detecting the state change in the line from the first type detecting process to a second type detecting process when the state change detection number counted per the unit time exceeds the threshold value,
wherein the first type detecting process is a process of detecting a state change in the line by a hardware interrupt, and wherein the second type detecting process is a process of detecting a state change in the line by polling.

21. The line monitoring apparatus according to claim 1, wherein the line is a communication line.

22. The line monitoring apparatus according to claim 1, wherein the line is a duplicated communication line or a redundant communication line.

* * * * *